(12) United States Patent
Morita et al.

(10) Patent No.: US 10,562,087 B2
(45) Date of Patent: Feb. 18, 2020

(54) DOOR BEAM

(71) Applicant: Kobe Steel, Ltd., Kobe-shi (JP)

(72) Inventors: Shinya Morita, Shimonoseki (JP); Tsunetake Tsuyoshi, Shimonoseki (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 16/393,502

(22) Filed: Apr. 24, 2019

(65) Prior Publication Data
US 2019/0321871 A1 Oct. 24, 2019

(30) Foreign Application Priority Data

Apr. 24, 2018 (JP) ................................. 2018-083510

(51) Int. Cl.
*E04C 3/00* (2006.01)
*B21C 23/08* (2006.01)
*B21C 25/02* (2006.01)
*C22C 21/10* (2006.01)
*B60J 5/04* (2006.01)
*C22F 1/053* (2006.01)

(52) U.S. Cl.
CPC .............. *B21C 23/08* (2013.01); *B21C 25/02* (2013.01); *B60J 5/0443* (2013.01); *C22C 21/10* (2013.01); *C22F 1/053* (2013.01); *E05Y 2900/531* (2013.01)

(58) Field of Classification Search
CPC ...... B60J 5/0443; B60J 5/0437; B60J 5/0444; B60J 5/0483; B60J 5/0458; B21D 22/025; B21D 5/083; B21D 22/00; C22C 21/16; C22C 21/00; C22C 21/18; Y10T 428/12354; Y10T 428/12993; Y10T 428/12375; Y10T 428/12382; Y10T 428/26
USPC ................. 52/837, 836, 831, 839, 855, 854; 296/146.5, 146.9; 280/797; 29/897.2; 428/577, 598, 599; 148/439, 437, 440; 420/541, 542, 543, 528
See application file for complete search history.

(56) References Cited

U.S. PATENT DOCUMENTS 5,466,032 A * 11/1995 Clausen ................. B60J 5/0448
296/187.12
6,231,995 B1 * 5/2001 Yamashita ............. B60J 5/0444
148/439

(Continued)

FOREIGN PATENT DOCUMENTS

CN 105804134 A 7/2016
EP 3 489 055 A1 5/2019

(Continued)

*Primary Examiner* — Chi Q Nguyen
(74) *Attorney, Agent, or Firm* — Oblon, McClelland, Maier & Neustadt, L.L.P.

(57) ABSTRACT

A door beam including an aluminum alloy extrusion extended in a longitudinal direction and having a pair of webs and a pair of flanges to be positioned on an inside and an outside in a vehicle width direction. The pair of webs connect the pair of flanges at joint portions of each of the pair of webs such that the pair of webs and the pair of flanges form a closed cross section in a direction perpendicular to the longitudinal direction, and each of the pair of webs has a welded portion in a vicinity of a neutral axis passing through a centroid of the closed cross section and parallel to the pair of flanges.

19 Claims, 2 Drawing Sheets

(56) References Cited

U.S. PATENT DOCUMENTS

| | | | |
|---|---|---|---|
| 6,334,252 B1* | 1/2002 | Sato | B23K 26/0838 |
| | | | 29/897.2 |
| 6,408,591 B1* | 6/2002 | Yamashita | B60J 5/0444 |
| | | | 296/146.6 |
| 9,045,162 B2* | 6/2015 | Marten | B62D 21/02 |
| 2003/0132643 A1* | 7/2003 | Sakuma | B60J 5/0444 |
| | | | 296/146.6 |
| 2007/0074791 A1* | 4/2007 | Yoshida | C22C 21/10 |
| | | | 148/439 |
| 2013/0161933 A1* | 6/2013 | Marten | B62D 21/02 |
| | | | 280/797 |
| 2017/0028825 A1* | 2/2017 | Eckart | B60J 5/0429 |
| 2017/0209910 A1* | 7/2017 | Clausen | B21C 23/002 |
| 2018/0236851 A1* | 8/2018 | Shimoaka | B60J 5/0437 |
| 2019/0152304 A1* | 5/2019 | Yoshida | B60J 5/0444 |

FOREIGN PATENT DOCUMENTS

| | | |
|---|---|---|
| JP | H5-38940 A | 2/1993 |
| JP | H7-227618 A | 8/1995 |
| JP | H8-170139 A | 7/1996 |
| JP | 10-306338 A | 11/1998 |
| JP | 2001-71025 A | 3/2001 |
| JP | 2003-154407 A | 5/2003 |
| JP | 2006-233336 A | 9/2006 |
| JP | 2007-231408 A | 9/2007 |
| JP | 2007-269118 A | 10/2007 |
| JP | 2009-45672 A | 3/2009 |
| JP | 2009-197269 A | 9/2009 |
| JP | 2010-181020 | 8/2010 |
| JP | 2016-112603 | 6/2016 |

* cited by examiner

US 10,562,087 B2

DOOR BEAM

CROSS-REFERENCE TO RELATED APPLICATIONS

The present application is based upon and claims the benefit of priority to Japanese Patent Application No. 2018-083510, filed Apr. 24, 2018, the entire contents of which are incorporated herein by reference.

BACKGROUND OF THE INVENTION

Field of the Invention

The present invention relates to an automotive door beam formed of an aluminum alloy extrusion with a closed-section structure.

Discussion of the Background

A door beam formed of an aluminum alloy extrusion typically includes a pair of flanges (outer flange located on the outside in a vehicle width direction and inner flange located on the inside in the direction) and a pair of webs connecting the flanges together. The door beam has a closed-section structure formed by the pair of flanges and the pair of webs (see Japanese Unexamined Patent Application Publication No. 2006-23336).

The aluminum alloy extrusion with such a closed-section structure is manufactured using a hollow die such as a porthole die, a bridge die, and a spider die. For example, an extrusion method using the porthole die uses a porthole die including a combination of a mandrel body having a plurality of portholes and a die. An aluminum billet is squeezed into the porthole die and divided into pieces by the portholes, and then the pieces are integrated again by welding while surrounding the mandrel. The inner surface of such a product is shaped by the mandrel while the outer surface thereof is shaped by the die, resulting in formation of an extrusion with a closed-section structure. Thus, welded portions necessarily exist in the aluminum alloy extrusion with the closed-section structure manufactured using the hollow die.

In the aluminum alloy extrusion having the welded portions, each welded portion has a microstructure different from that of any other portion (normal portion), and the welded portion disadvantageously has low mechanical properties, for example, a low fracture limit, compared with the normal portion. For a door beam formed of the aluminum alloy extrusion, such a low fracture limit of the welded portion may cause a reduction in strength and energy absorption of the door beam as an energy absorbing member.

The aluminum alloy extrusion with the closed-section structure having the welded portions has been investigated to improve mechanical properties of the welded portions by adjusting a material composition or a manufacturing condition as described in Japanese Unexamined Patent Application Publication Nos. Hei10(1998)-306338, 2003-154407, 2007-231408, and 2009-45672, for example.

SUMMARY OF THE INVENTION

According to an aspect of the present invention, a door beam includes an aluminum alloy extrusion extended in a longitudinal direction and having a pair of webs and a pair of flanges to be positioned on an inside and an outside in a vehicle width direction. The pair of webs connect the pair of flanges at joint portions of each of the pair of webs such that the pair of webs and the pair of flanges form a closed cross section in a direction perpendicular to the longitudinal direction, and each of the pair of webs has a welded portion in a vicinity of a neutral axis passing through a centroid of the closed cross section and parallel to the pair of flanges.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
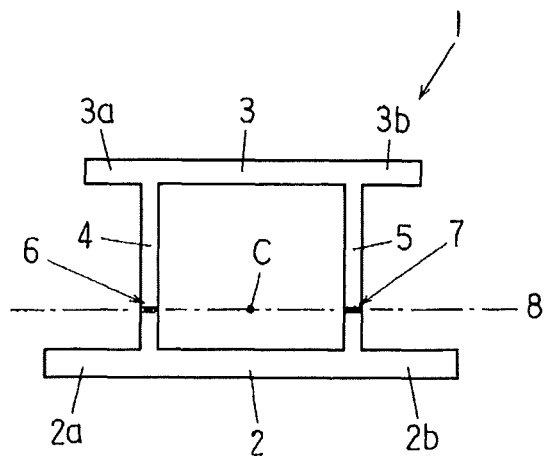
FIG. 1 is a cross-sectional view (section structure) of a door beam according to one embodiment of the invention.

The embodiments will now be described with reference to the accompanying drawings, wherein like reference numerals designate corresponding or identical elements throughout the various drawings.

A door beam according to an embodiment of the invention is now described with reference to FIG. 1.

A door beam 1 is made from an aluminum alloy extrusion extended in a longitudinal direction (extrusion direction) and has a closed-section structure (closed cross section) of FIG. 1 in a direction perpendicular to the longitudinal direction. The door beam 1 includes a pair of flanges (inner flange 2, outer flange 3), and a pair of webs 4 and 5 that connect the flanges 2 and 3 together. The pair of webs 4 and 5 connect the pair of flanges 2 and 3 at joint portions of each of the pair of webs 4 and 5 such that the pair of webs 4 and 5 and the pair of flanges 2 and 3 form the closed cross section as shown in FIG. 1. The pair of webs 4 and 5 have welded portions 6 and 7 along the longitudinal direction (extrusion direction). The respective inner flange 2 and outer flange 3 have portions (projecting flanges 2a, 2b, 3a, and 3b) projecting outward from the webs 4 and 5. Within the door, the inner flange 2 is disposed on the inner side in the vehicle width direction, while the outer flange 3 is disposed on the outer side in the direction. The width direction of each of the flanges 2 and 3 (lateral direction of FIG. 1) corresponds to a vertical direction. As shown in FIG. 1, the webs 4, 5 are positioned away from each other in a direction corresponding to the vertical direction of a vehicle. The pair of flanges 2, 3 and the pair of webs 4, 5 are connected perpendicularly to each other while each having a plate-like shape.

Figure 3:
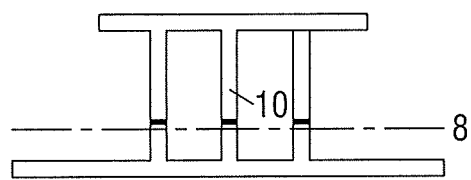
FIG. 3 is a cross-sectional view of a door beam according to still another embodiment of the present invention.

As shown in FIG. 3, the door beam 1 may have at least one middle rib 10 between the webs 4 and 5.

In the door beam 1 of FIG. 1, the projecting flanges 2a, 2b and 3a, 3b are present at both ends of the flanges 2 and 3, respectively. However, the door beam of this embodiment is not limited to such a structure. As another possible sectional shape, one or both flanges may have no projecting flange.

In the door beam 1, welded portions 6 and 7 are formed in the webs 4 and 5, respectively, and are each located on a neutral axis 8 as shown in FIG. 1. The neutral axis 8 is parallel to each of the flanges 2 and 3, and passes through a centroid C of a cross section (perpendicular to an extrusion direction). The welded portions 6 and 7 are formed along the longitudinal direction of the door beam 1 (extrusion direction of the aluminum alloy extrusion).

In such a section structure, when the door beam 1 is bent-deformed by, for example, a vehicle collision, a magnitude of a bending load (longitudinal tensile or compressive load) exerted on the webs 4 and 5 is substantially zero at a position of the welded portion 6 or 7 (position of the neutral axis 8). As a result, deformation of the web 4 or 5 starting from the welded portion 6 or 7, respectively, can be suppressed, and energy absorption by the door beam 1 can be increased.

Figure 2:
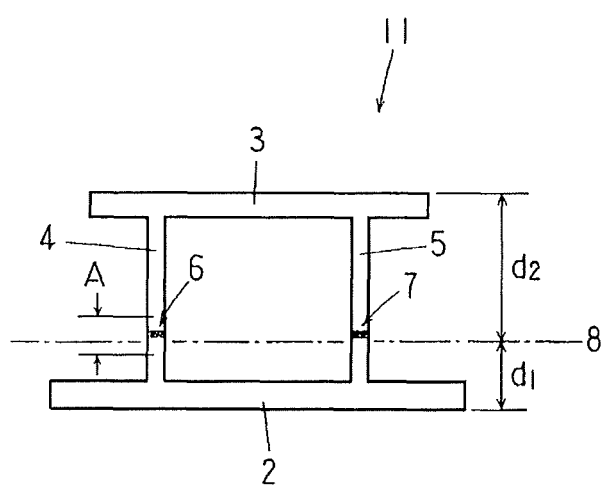
FIG. 2 is a cross-sectional view (section structure) of a door beam according to another embodiment of the invention.

FIG. 2 illustrates a door beam according to another embodiment of the invention. In FIG. 2, the element corresponding to the element in the door beam 1 of FIG. 1 is designated by the same numeral.

A door beam 11 of FIG. 2 has a closed cross section having substantially the same shape as that of the door beam 1. But the welded portions 6 and 7 are formed at positions each slightly shifted from the neutral axis 8 toward the flange 3 (outward in the vehicle width direction). When the door beam 11 is bent-deformed toward the vehicle inside during collision, the magnitudes of the bending loads exerted on the webs 4 and 5 are each roughly proportional to a distance from the neutral axis 8. Hence, when the welded portions 6 and 7 are each formed at a position near the neutral axis 8 as in the door beam 11, and when the door beam 11 is bent-deformed during collision, the magnitude of the bending load (longitudinal tensile or compressive load) exerted on the web 4 or 5 is small at the position of the welded portion 6 or 7.

Each of the welded portions 6 and 7 is more preferably located at a position closer to the neutral axis 8. In the door beam according to this embodiment of the invention, therefore, the welded portions 6 and 7 are in the vicinity (including on the neutral axis 8 itself) of the neutral axis 8. The vicinity of the neutral axis 8 means a region within a range from the neutral axis 8 to a point of $d_1/5$ inward in the vehicle width direction and to a point of $d_2/5$ outward in the vehicle width direction (range as shown by A in FIG. 2), where $d_1$ is the distance from the surface of the flange 2 to the neutral axis 8, and $d_2$ is the distance from the neutral axis 8 to the surface of the flange 3 (see FIG. 2). When the welded portions 6 and 7 are located within the range A, the welded portions 6 and 7 do not receive a large bending load when the door beam is bent-deformed by collision. The welded portions 6 and 7 each have a predetermined width (thickness) in the vertical direction of FIG. 2 in a cross-section perpendicular to the extrusion direction. If the center of the width of each of the welded portions 6 and 7 is located within the range A, the welded portions 6 and 7 are regarded as located within the range A. From the viewpoint of reducing a bending load exerted on the welded portion, the welded portions 6 and 7 are preferably positioned closer to the neutral axis 8, for example, to be located within a range from the neutral axis 8 to a point of $d_1/10$ inward in the vehicle width direction and to a point of $d_2/10$ outward in the vehicle width direction.

The welded portion may also be formed not only in the webs 4 and 5 but also in the flanges 2 and 3. In bending deformation of the door beam during collision, although a large bending load (longitudinal tensile or compressive load) is exerted on each of the flanges 2 and 3 at the bending inside and the bending outside, since such a bending load is exerted on the entire width of each of the flanges 2 and 3, the welded portions do not significantly affect strengths and deformation modes of the flanges 2 and 3. When the middle rib 10 is provided between the webs 4 and 5, and when the welded portion is formed in the middle rib 10, the welded portion is preferably formed in the vicinity of the neutral axis 8 (see FIG. 3).

An aluminum alloy extrusion with a closed-section structure as a material of the door beam may be manufactured using a hollow die such as a porthole die, a bridge die, and a spider die. The welded portions 6 and 7, which are each formed by temporarily dividing a metal flow in the hollow die and then integrating the divided metal flows, exist along a longitudinal direction (extrusion direction) of the aluminum alloy extrusion, and each have a microstructure different from that of a portion (normal portion) other than the welded portions. Each welded portion is a region between the normal portions, and typically has a width (thickness) of about 2 to 3 mm in the vertical direction of FIG. 2 in a cross-section perpendicular to the extrusion direction for the aluminum alloy extrusion. The aluminum alloy extrusion has one aluminum alloy composition in whole.

Figure 4:
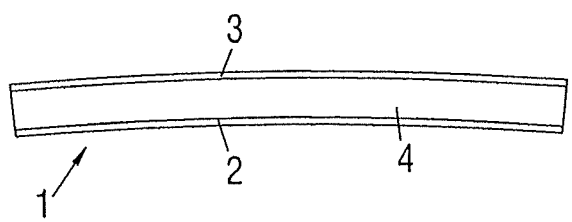
FIG. 4 is a plan view of a door beam according to yet another embodiment of the present invention along the longitudinal direction which is curved in a convex form toward the outer side in a width direction of a vehicle body.
Figure 5:
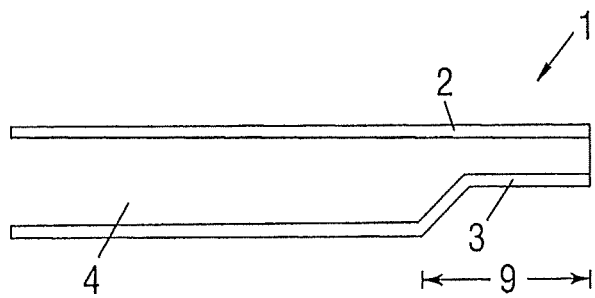
FIG. 5 is a plan view of a door beam which is press-formed according to an embodiment of the present invention.

The door beam may have a straight shape in the longitudinal direction, i.e., may be not subjected to bend forming, or may have another shape including a shape being convexly curved outward in the vehicle width direction as shown in FIG. 4, which is formed by bend forming of the extrusion in the longitudinal direction (so-called large R bending) (for example, see FIG. 5B of Japanese Unexamined Patent Application Publication No. 2015-147490). As another possible shape of the door beam, at least a longitudinal part of the door beam may be subjected to press working (crushing or press-forming) as shown in FIG. 5 so that the door beam has a crushed portion 9 where a space between the pair of flanges is reduced, in the longitudinal part of the door beam.

In the above embodiments of the invention, in order to secure greater strength against bending deformation during collision, the flanges 2 and 3 positioned farther away from the neutral axis 8 are preferably made thicker than the webs 4 and 5 positioned closer to the neutral axis 8. In the case of extrusion using a hollow die, if the thickness of one of the two sides (flange and web) connected to each other exceeds three times of the thickness of the other, manufacturing defects such as underfill tend to occur. In the embodiments of the invention, therefore, the thicknesses of the flanges 2 and 3 are preferably set to larger than one times and equal to or smaller than three times of the thicknesses of the webs 4 and 5, respectively. The respective thicknesses of the flanges 2 and 3 are more preferably two to three times of the thicknesses of the webs 4 and 5.

While a high-strength 7000-series aluminum alloy extrusion has a lower fracture limit than a 6000-series aluminum alloy extrusion and tends to induce stress corrosion cracking, it can be preferably, but not limitedly, used as the aluminum alloy extrusion as a material of the door beam. A composition defined in JIS or the AA standard can be used as a composition of the 7000-series aluminum alloy. For example, a 7000-series aluminum alloy may have a composition where Al is included at the largest content in percent by mass, Zn is included at the second largest content, and Mg is included at the third largest content. Such alloys include an Al—Zn—Mg alloy and an Al—Zn—Mg—Cu alloy. A preferred composition may contain, in percent by mass, Zn: 3 to 8, Mg: 0.4 to 2.5, Cu: 0.05 to 2.0, Ti: 0.005 to 0.2, and at least one of Mn: 0.01 to 0.5, Cr: 0.01 to 0.3, and Zr: 0.01 to 0.3, with the remainder consisting of Al and impurities.

The present application addresses the following. Applicant found that it is difficult to equalize mechanical properties between the welded portion and the normal portion of the aluminum alloy extrusion even by adjusting the material composition or the manufacturing condition.

An aspect of the invention is to prevent easy fracturing during collision of the door beam formed of the aluminum alloy extrusion with the closed-section structure having such welded portions.

A door beam according to one embodiment of the invention is formed of an aluminum alloy extrusion with a closed-section structure having welded portions along a longitudinal direction (extrusion direction) of the door beam, and includes a pair of flanges disposed on the inside and on the outside in a vehicle width direction, and a pair of webs connecting the pair of flanges together, where the welded portions are formed in the pair of webs and are each present in the vicinity of a neutral axis of bending involved in bending deformation in the vehicle width direction.

In the door beam according to the embodiment of the invention, the welded portions are formed in the pair of webs, and are each present in the vicinity of a neutral axis. As such, when the door beam is bent-deformed by collision, the welded portions do not receive a large bending load. As a result, deformation of the webs starting from the welded portion are less likely to occur at collision.

Obviously, numerous modifications and variations of the present invention are possible in light of the above teachings. It is therefore to be understood that within the scope of the appended claims, the invention may be practiced otherwise than as specifically described herein.

What is claimed is:

1. A door beam, comprising:
   an aluminum alloy extrusion extended in a longitudinal direction and having a pair of webs and a pair of flanges to be positioned on an inside and an outside in a vehicle width direction,
   wherein the pair of webs connect the pair of flanges at joint portions of each of the pair of webs such that the pair of webs and the pair of flanges form a closed cross section in a direction perpendicular to the longitudinal direction, and
   each of the pair of webs has a welded portion in a vicinity of a neutral axis passing through a centroid of the closed cross section and parallel to the pair of flanges; and wherein the aluminum alloy extrusion comprises an aluminum alloy including Al, 3-8 mass % of Zn, 0.4-2.5 mass % of Mg, 0.05-2.0 mass % of Cu, and 0.005-0.2 mass % of Ti, and further including at least one of 0.01-0.5 mass % of Mn, 0.01-0.3 mass % of Cr, and 0.01-0.3 mass % of Zr.

2. The door beam according to claim 1, wherein the aluminum alloy extrusion comprises a 7000 series aluminum alloy extrusion.

3. The door beam according to claim 2, wherein each of the pair of webs has the welded portion on the neutral axis.

4. The door beam according to claim 2, wherein the aluminum alloy extrusion has an intermediate rib connecting the pair of flanges and positioned between the pair of webs.

5. The door beam according to claim 4, wherein the intermediate rib has a welded portion in the vicinity of the neutral axis.

6. The door beam according to claim 2, wherein the aluminum alloy extrusion is bent along the longitudinal direction such that the aluminum alloy extrusion is curved in a convex form toward an outer side in a vehicle width direction.

7. The door beam according to claim 2, wherein the aluminum alloy extrusion includes an end portion in the longitudinal direction where a distance between the pair of the flanges is narrowed.

8. The door beam according to claim 1, wherein each of the pair of webs has the welded portion on the neutral axis.

9. The door beam according to claim 8, wherein the aluminum alloy extrusion has an intermediate rib connecting the pair of flanges and positioned between the pair of webs.

10. The door beam according to claim 9, wherein the intermediate rib has a welded portion on the neutral axis.

11. The door beam according to claim 8, wherein the aluminum alloy extrusion is bent along the longitudinal direction such that the aluminum alloy extrusion is curved in a convex form toward an outer side in a vehicle width direction.

12. The door beam according to claim 8, wherein the aluminum alloy extrusion includes an end portion in the longitudinal direction where a distance between the pair of the flanges is narrowed.

13. The door beam according to claim 8, wherein each of the pair of the flanges has a thickness greater than a thickness of each of the webs.

14. The door beam according to claim 1, wherein the aluminum alloy extrusion has an intermediate rib connecting the pair of flanges and positioned between the pair of webs.

15. The door beam according to claim 14, wherein the intermediate rib has a welded portion in the vicinity of the neutral axis.

16. The door beam according to claim 1, wherein the aluminum alloy extrusion is bent along the longitudinal direction such that the aluminum alloy extrusion is curved in a convex form toward an outer side in a vehicle width direction.

17. The door beam according to claim 1, wherein the aluminum alloy extrusion includes an end portion in the longitudinal direction where a distance between the pair of the flanges is narrowed.

18. The door beam according to claim 1, wherein each of the pair of the flanges has a thickness greater than a thickness of each of the webs.

19. A method of producing the door beam of claim 1, comprising:
   pressing an aluminum billet into a porthole die having a plurality of portholes such that pressed aluminum billet is divided by the portholes; and
   welding divided aluminum billets to one another such that the aluminum alloy extrusion is formed.

* * * * *